United States Patent
Saur

(10) Patent No.: US 6,364,808 B1
(45) Date of Patent: Apr. 2, 2002

(54) APPARATUS FOR CHANGING THE TRANSMISSION RATIO OF A CONTINUOUSLY ADJUSTABLE TRANSMISSION AS PART OF A CRUISE CONTROL SYSTEM FOR MOTOR VEHICLES

(75) Inventor: Jörg Saur, Eislingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/526,898

(22) Filed: Mar. 16, 2000

(30) Foreign Application Priority Data

Mar. 16, 1999 (DE) .......................................... 199 11 538

(51) Int. Cl.⁷ .............................................. B60K 41/14
(52) U.S. Cl. ............................ 477/42; 477/47; 477/108
(58) Field of Search ........................ 477/42, 108, 118, 477/47

(56) References Cited

U.S. PATENT DOCUMENTS

| 4,771,656 | A | * | 9/1988 | Itoh et al. ....................... 477/42 |
| 4,936,403 | A | * | 6/1990 | Morimoto .................... 180/176 |
| 4,947,953 | A | * | 8/1990 | Morimoto ..................... 477/42 |
| 5,217,086 | A | * | 6/1993 | Morimoto ..................... 477/42 |
| 5,544,056 | A | * | 8/1996 | Seireg et al. ................ 477/108 |

FOREIGN PATENT DOCUMENTS

| DE | 4330391 | 10/1994 |
| DE | 19540925 | 5/1997 |
| EP | 658711 | 6/1995 |

* cited by examiner

*Primary Examiner*—Sherry Estremsky
(74) *Attorney, Agent, or Firm*—Kenyon & Kenyon

(57) ABSTRACT

An apparatus for changing the transmission ratio of a continuously adjustable transmission as part of a cruise control system for motor vehicles, this part being provided with a controller (18) for the formation of a change value ($I_{SOLL}$) for the transmission ratio as a function of the difference by which the actual value of the speed of travel ($V_{IST}$) in overrun operation exceeds a stipulated value ($V_{SCHRUB}$). An adding stage (20) is used for the formation of a desired value ($I_{SOLL\_F}$) for the transmission ratio from the change value ($I_{SOLL}$) and the stored desired value ($I_{VSCHUB}$) of the transmission ratio at the beginning of overrun operation, it being possible for this desired value ($I_{SOLL\_F}$) to be fed to a transmission-ratio controller for the transmission. As a result, a defined increase in vehicle speed leads to a similar change in the transmission ratio in each vehicle-speed range, and the transmission intervention is always ended exactly at the same transmission ratio at which it began. Moreover, decelerations by means of the cruise-controller operating lever are always reproducible down to a constant minimum value, irrespective of the particular vehicle-speed or engine-speed range.

24 Claims, 2 Drawing Sheets

APPARATUS FOR CHANGING THE TRANSMISSION RATIO OF A CONTINUOUSLY ADJUSTABLE TRANSMISSION AS PART OF A CRUISE CONTROL SYSTEM FOR MOTOR VEHICLES

CROSS REFERENCE TO RELATED APPLICATION

Priority is claimed with respect to German Application No. 11 538.9-14 filed in Germany on Mar. 16, 1999, the disclosure of which is incorporated herein by reference.

The invention relates to an apparatus for changing the transmission ratio of a continuously adjustable transmission, e.g. a CVT, as part of a cruise control system for motor vehicles.

Cruise controllers combined with step-change gearboxes are known and are widely used, especially in larger motor vehicles. Fundamentally, a cruise controller controls the speed of travel as a function of a stipulated desired value by influencing the fuel supply. While this presents no problems during straight-ahead travel and hill climbing, there is the risk, particularly during downhill travel, that the speed of travel will continue to increase due to the downhill slope, despite the fuel supply being reduced to zero. Generally, therefore overrun cut-off is first of all activated and, if this is still not sufficient, the step-change gearbox is changed down by one gear or even by several gears in order to increase the engine braking effect.

Cruise controllers have hitherto not been used with continuously variable transmissions and the possibilities for transferring the known type of cruise control to continuously variable transmissions are limited due to the lack of gear stages.

DE 43 30 391 A1 and EP 0 658 711 A1 have disclosed continuously variable transmissions, but these were not combined with a cruise controller. All that is provided there are measures which ensure that when the accelerator pedal is in the idle-speed position during downhill travel, the speed of travel at the time when downhill travel began is held or held at least as tar as possible by changing the transmission ratio.

One object of the present invention is to design a cruise controller in a vehicle with a continuously adjustable transmission in such a way that comfortable retention or reduction of the speed of travel is made possible even on a downhill slope and when the desired vehicle speed is reduced by the driver.

SUMMARY OF THE INVENTION

By means of the apparatus according to the invention as part of a cruise control system combined with a continuously adjustable transmission, it is possible to adjust the transmission ratio steadily and continuously and in such a way that it is matched exactly to the load conditions without impairment by gear-change jerks. It is particularly advantageous here that, when the overrun phase ends after downhill travel, exactly the same transmission ratio as was previously effective is re-established. There is thus no discernible gear-change operation and this offers the ideal conditions for maximum comfort.

The stipulated value, which is compared with the actual value of the speed of travel to form the difference value, is preferably the value of the speed of travel at the beginning of overrun operation and/or the decreasing desired value for the speed of travel in the case of a specifically intended vehicle deceleration by means of an operating element of the cruise controller.

For controlling the transmission ratio, use is preferably made of a P controller which has no time delay behaviour and hence avoids overshooting or undershooting.

The controller for the formation of a change value for the transmission ratio has an engine-speed limiting device which advantageously prevents a further change in the transmission ratio when a stipulatable maximum speed of the drive motor for the motor vehicle is reached in order to ensure that a troublesome noise level is not reached. This controller furthermore advantageously has arranged on its output side a characteristic-curve modification stage which, in the case of small change rates for the transmission ratio, transmits reduced versions of these values and/or, in the case of larger change values, transmits increased versions of these values. This means that, in the case of a small vehicle-speed overshoot, the change in the transmission ratio can be made moderate but, as the downhill slope increases, can be made progressive, thus allowing optimum adaptation to the conditions of the downhill slope to achieve maximum comfort.

The stipulated value for this controller is furthermore expediently provided with an offset in order to allow better adaptation of the effective controller intervention to the specifics of the vehicle.

A limiting device for the transmission ratio furthermore contributes to an increase in comfort since this measure too helps to avoid the unwanted imposition of troublesome noise.

To increase safety and avoid an unwanted and impermissible transmission intervention when the conditions envisaged for this have not been met, e.g. due to a fault or a faulty signal, there is a cut-off device which prevents a desired value being stipulated for the transmission ratio by the cruise controller, this cut-off device only permitting this desired-value stipulation when the actual value of the speed of travel exceeds the stipulated value.

To limit transmission interventions to what is necessary, it is expedient if, in overrun operation, an overrun cut-off is activated first before the transmission ratio is changed by the cruise controller. This can be preferably switched on with a hysteresis at a stipulatable difference between the desired value and the actual value of the speed of travel and exerts a certain braking action. The change in the transmission ratio is then triggered at a larger stipulatable difference between the desired value and the actuable value of the speed of travel.

BRIEF DESCRIPTION OF THE DRAWING

An illustrative embodiment of the invention shown in the drawing and explained in greater detail in the description which follows. In the drawing.

DETAILED DESCRIPTION OF THE PREFERRED EMBODIMENTS

Figure 1:
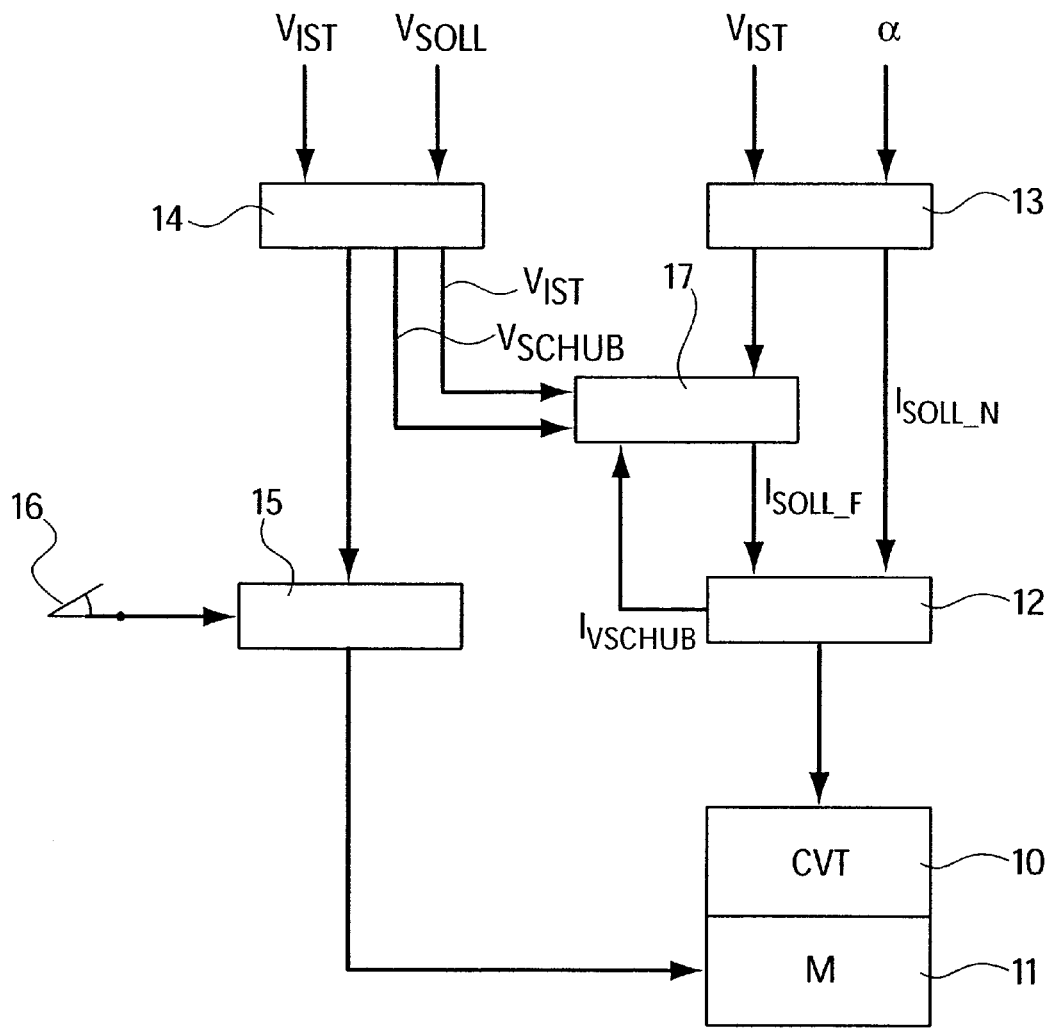
FIG. 1 shows an overall block circuit diagram of a cruise controller in conjunction with a continuously variable transmission and an internal combustion engine and FIG. 2 shows a block diagram of a stipulation device for the desired value of the transmission ratio on the part of the cruise controller as an illustrative embodiment of the invention.

The block circuit diagram in FIG. 1 shows schematically a continuously adjustable transmission 10, designed as a CVT (CVT=Continuously Variable Transmission), and an internal combustion engine (M) 11 connected to the said transmission and belonging to a motor vehicle. The transmission ratio of the transmission 10 is set and controlled by means of a transmission-ratio controller 12, to which a desired value $I^{SOLL}{}_N$ is fed by an electronic transmission control 13. In the transmission control 13, the desired value $I_{SOLL\_N}$ calculated as a function of the current speed of travel $V_{IST}$ and the power demand α from the driver. An arrangement of this kind is known, for example, from the prior art mentioned at the outset, it also being possible for the desired value to be calculated as a function of other parameters as well.

A customary cruise controller 14 forms a control value for a fuel metering device 15 for the internal combustion engine 11 as a function of the current speed of travel $V_{IST}$ and a desired vehicle-speed value $V_{SOLL}$ stipulated by means of an operating lever. This fuel metering device 15 is customarily a fuel injection computer which receives its control commands from the accelerator pedal 16 for the speed of travel or from the speed-of-travel controller. The control value acts either by means of an electric motor on the throttle valve or is used directly to form the injection signal.

In the activated state and given an increase in vehicle speed on a downhill slope or a desire for deceleration, known cruise controllers 14 of this kind act initially on the fuel metering device 15 and reduce the accelerator-pedal position or the quantity of fuel injected or supplied until the desired value or control value of the cruise controller is zero. If the actual vehicle speed $V_{IST}$ is still too high or the difference between $V_{SOLL}$ and $V_{IST}$ becomes even greater, the invention specifies a transmission intervention in order to additionally increase the transmission braking torque by changing the transmission ratio. This takes place, for example, if the desired value $V_{SOLL}$ is exceeded by 6 km/h.

If the internal combustion engine 11 is designed as a diesel engine, for example, the transmission intervention takes place even earlier. The same applies if an electric motor or hybrid motor with a continuously adjustable transmission is provided as the drive motor for the motor vehicle.

For the transmission intervention use is made of a stipulation device 17 for the desired value $I_{SOLL\_F}$ of the transmission ratio on the part of the cruise controller. When such a desired value $I_{SOLL\_F}$ is formed, it replaces the desired value $I_{SOLL\_N}$, i.e. there is either a switchover or priority control. The input variables which the stipulation device 17 receives from the speed-of-travel controller 14 are the current speed of travel $V_{IST}$ and the overrun speed $V_{SCHUB}$, the latter representing the vehicle speed at which the desired value or control value of the cruise controller 14 has reached zero. This value $V_{SCHUB}$ is in each case stored in the cruise controller 14.

Figure 2:
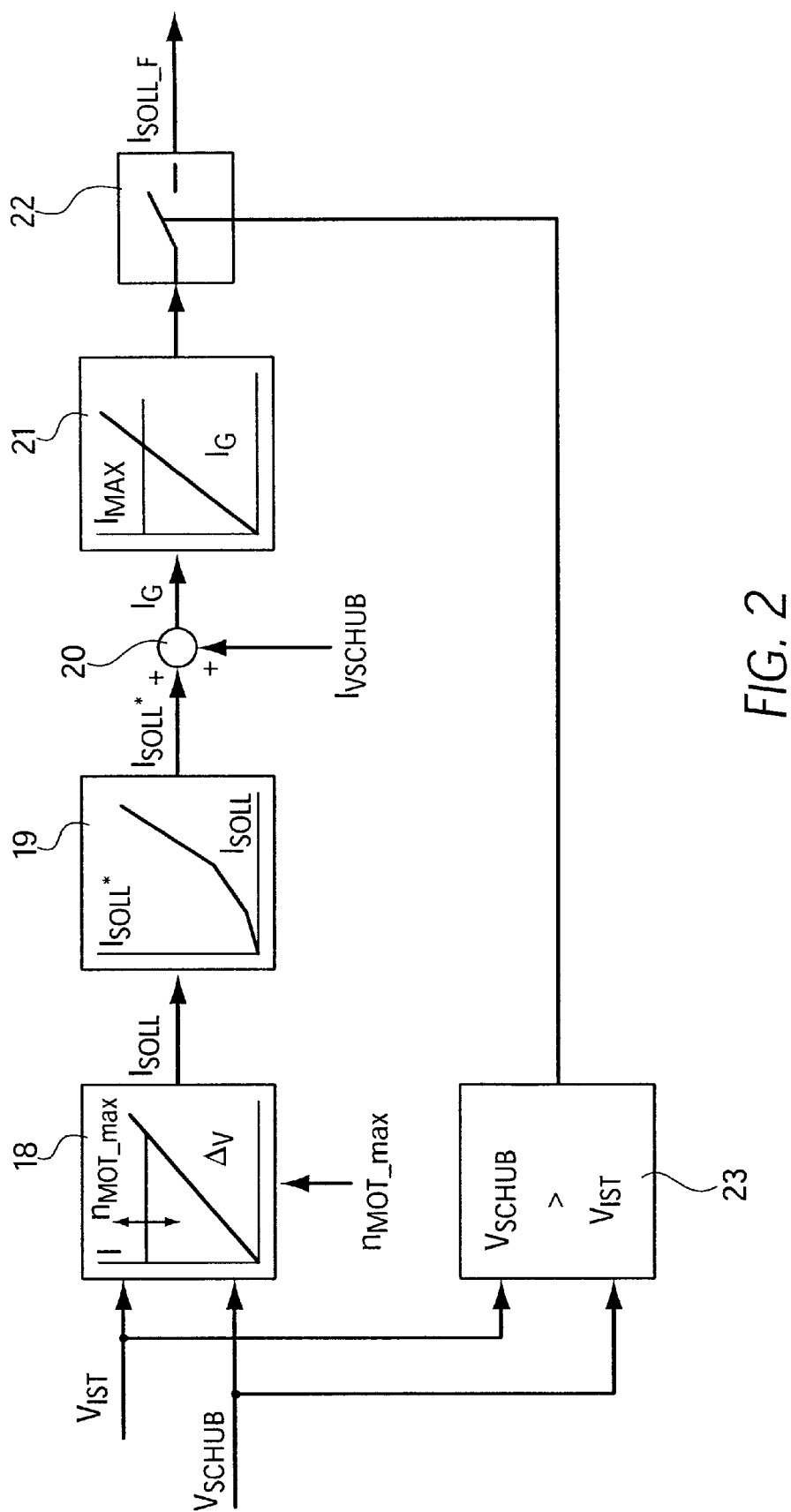

The stipulation device 17 for the desired value of the transmission ratio is shown in more detail in FIG. 2 and is described in greater detail below. The two values described, $V_{IST}$ and $V_{SCHUB}$, are first of all fed to a P controller 18 for controlling the desired value for the transmission ratio. At its output, this P controller 18 produces a desired value $I_{SOLL}$ for the change in the transmission ratio as a function of these two values. The greater the difference ΔV, the greater is the change in this desired value $I_{SOLL}$. However, this desired value for the change in the transmission ratio is increased only until a maximum applicable engine-speed threshold $n_{MOT\_max}$ is reached. Corresponding control signals must therefore be fed to this P controller 18. This limit is provided for reasons of comfort to ensure that noise levels do not become troublesome. The limit is correlated with the vehicle speed, i.e. at higher vehicle speeds, a smaller change in the transmission ratio is possible than at lower speeds.

In principle, it will also be possible to use other types of controller, e.g. PD, PI and PID controllers, instead of a P controller 18, especially when their D, I or ID effect is relatively weak.

The desired value $I_{SOLL}$ is now fed to a characteristic-curve modification stage 19. There, the desired value $I_{SOLL}$ is modified in such a way that the change in the transmission ratio is modest if the amount by which $V_{IST}$ exceeds $V_{SCHUB}$ is small but becomes progressively larger with an increase in the downhill slope, i.e. a larger vehicle speed overshoot. This can be performed using a number of interpolation points in the characteristic curve.

The modified desired-value signal $I_{SOLL}{}^*$ for the change in the transmission ratio is now fed to an adding stage 20, in which a desired value $I_{VSCHUB}$ is added. This desired value $I_{VSCHUB}$ is the desired value for the transmission ratio which was present at the time when the value $V_{SCHUB}$ was formed, i.e. at the time at which the desired value or control value stipulated by the cruise controller 14 reached the value zero. As a result, it is possible to respond in the same way at any time, at any vehicle speed and at any transmission ratio at the beginning of the unwanted increase in vehicle speed in the case of a downhill slope or a reduction in the desired vehicle speed by means of the operating lever of the cruise controller. This means, on the one hand, that a defined increase in vehicle speed leads to a similar change in the transmission ratio in any vehicle speed range and, on the other hand, the transmission intervention is, as a result, always ended exactly at the same transmission ratio at which it began. Thus, the vehicle continues at the same engine-speed level at the end of the downhill slope as it had when it reached the downhill slope. There is therefore no discernible gear change operation.

The output signal $I_G$ of the adding stage 20 is fed to a limiting device 21 for the transmission ratio, in which the desired value is limited to a maximum of $I_{MAX}$ in order to avoid troublesome noise due to high engine speeds, even at relatively low vehicle speeds.

The output signal of the limiting device 21 is fed as a desired value $I_{SOLL\_F}$ to the transmission-ratio controller 12 for the transmission 10 via a cut-off device 22. This cut-off device is controlled by a comparison device 23 in which the two input signals for the P controller 18 are compared with one another. As long as $V_{SCHUB}$ is greater than $V_{IST}$, the cut-off device 22 remains off, i.e. the cruise controller cannot perform a transmission intervention, even if an output value $I_{SOLL\_F}$ is formed due to malfunctions or faults. This serves to increase reliability of operation.

To enable better adaptation of the effective control intervention to the circumstances of the vehicle to be performed, the overrun speed $V_{SCHUB}$ can furthermore be provided with an offset in the P controller 18.

In the description, the case described thus far was one in which, while the desired-value stipulation $V_{SOLL}$ by the cruise controller remains the same, there is a tendency for the actual speed VIST to increase due to a downhill slope, this being prevented or limited by a transmission intervention. Conditions are similar when the driver intends to reduce the speed of travel by actuating an operating lever of the cruise controller 14. In such a case too, the difference between $V_{IST}$ and $V_{SOLL}$ will increase. Instead of the desired value $V_{SCUB}$, the P controller 18 is now supplied with a negative desired vehicle speed ramp which corresponds to a desired deceleration $V_{VERZ}$. Fundamentally, the controller operates as described above. The difference now is that this vehicle-speed ramp, which corresponds to an applicable deceleration, is started when the desired value or control value of the cruise controller 14 reaches the value zero. If the reduction in vehicle speed is greater than that stipulated by the deceleration ramp, the output value of the P controller 18 remains at zero and the comparison device 23 keeps the cut-off device 22 off. If, however, the decrease in vehicle speed is less than that stipulated by the deceleration ramp, the P controller. 18 produces a change in the transmission ratio as described in the case of the downhill slope.

In a simpler embodiment, it would also be possible for one or more of the subassemblies 19, 21, 22, 23 to be omitted.

While the above description constitutes the preferred embodiment of the invention, it will be appreciated that the invention is susceptible to modification, variation, and change without departing from the proper scope or fair meaning of the accompanying claims.

What is claimed is:

1. Apparatus for changing the transmission ratio of a continuously adjustable transmission as part of a cruise control system, having a controller for the formation of a change value ($I_{SOLL}$) for the transmission ratio as a function of the difference by which the actual value of the speed of travel ($V_{IST}$) in overrun operation exceeds a stipulated value ($V_{SCHUB}$ or $V_{VERZ}$), and having an adding stage for the formation of a desired value ($I_{SOLL\_F}$) for the transmission ratio from the change value ($I_{SOLL}$) and a stored desired value ($I_{VSCHUB}$) of the transmission ratio at the beginning of overrun operation, the desired value ($I_{SOLL\_F}$) being fed to a transmission-ratio controller for the transmission.

2. Apparatus according to claim 1, wherein the stipulated value is the value of the speed of travel ($V_{SCHUB}$) at the beginning of overrun operation or at the time at which an output value of the cruise controller for fuel metering reaches the value zero.

3. Apparatus according to claim 1, wherein the stipulated value is the decreasing desired value ($V_{VERZ}$) for the speed of travel in the case of a specifically intended vehicle deceleration by means of an operating element of the cruise controller.

4. Apparatus according to claim 1 wherein the controller for the formation of a change value for the transmission ratio is designed as a P controller.

5. Apparatus according to claim 1 wherein the controller for the formation of a change value for the transmission ratio has an engine-speed limiting device to prevent a further change in the transmission ratio when a stipulatable maximum engine speed ($n_{MOT\_max}$) of the drive motor for the motor vehicle is reached.

6. Apparatus according to claim 1 wherein the controller for the formation of a change value for the transmission ratio has, on its output side, a characteristic-curve modification stage which, in the case of small change values for the transmission ratio, transmits reduced versions of these values and/or, in the case of larger change values, transmits increased versions of these values.

7. Apparatus according to one claim 1 wherein the stipulated value for the controller for the formation of a change value for the transmission ratio is provided with an offset.

8. Apparatus according to claim 1 wherein a limiting device for the transmission ratio is provided.

9. Apparatus according to claim 1 wherein a cut-off device is provided to prevent a desired value ($I_{SOLL\_F}$) being stipulated for the transmission ratio by the cruise controller, this cut-off device only permitting this desired-value stipulation when the actual value of the speed of travel ($V_{IST}$) exceeds the stipulated value ($V_{SCHUB}$ or $V_{VERZ}$).

10. Apparatus according to claim 1 wherein, in overrun operation, an overrun cut-off is activated first before the transmission ratio is changed by the cruise controller.

11. Apparatus according to claim 10 wherein the overrun cut-off can be switched on with a hysteresis at a stipulatable difference between the desired value ($V_{SOLL}$) and the actual value ($V_{IST}$) of the speed of travel.

12. Apparatus according to claim 11 wherein the change in the transmission ratio can be triggered at a larger stipulatable difference between the desired value ($V_{SOLL}$) and the actual value ($V_{IST}$) of the speed of travel.

13. Apparatus for changing a transmission ratio of a continuously adjustable transmission as part of a cruise control system, comprising:
a controller configured to form a change value for the transmission ratio as a function of a difference by which an actual value of a speed of travel in overrun operation exceeds a stipulated value; and
an adding stage configured to form a desired value for the transmission ratio from the change value and a stored desired value of the transmission ratio at a beginning of the overrun operation, the desired value being feedable to a transmission-ratio controller for the transmission.

14. Apparatus according to claim 13, wherein the stipulated value is the value of the speed of travel at the beginning of overrun operation or at the time at which an output value of the cruise controller for fuel metering reaches the value zero.

15. Apparatus according to claim 13, wherein the stipulated value is the decreasing desired value for the speed of travel in the case of a specifically intended vehicle deceleration by an operating element of the cruise controller.

16. Apparatus according to claim 13, wherein the controller configured to form the change value for the transmission ratio includes a P controller.

17. Apparatus according to claim 13, wherein the controller configured to form the change value for the transmission ratio includes an engine-speed limiting device configured to prevent a further change in the transmission ratio when a stipulatable maximum engine speed of the drive motor for the motor vehicle is reached.

18. Apparatus according to claim 13, wherein the controller configured to form the change value for the transmission ratio includes, on its output side, a characteristic-curve modification stage which, in the case of small change values for the transmission ratio, transmits reduced versions of these values and/or, in the case of larger change values, transmits increased versions of these values.

19. Apparatus according to one claim 13, wherein the stipulated value for the controller configured to form the change value for the transmission ratio includes an offset.

20. Apparatus according to claim 13, further comprising a device configured to limit the transmission ratio.

21. Apparatus according to claim 13, further comprising a cut-off device configured to prevent a desired value being stipulated for the transmission ratio by the cruise controller, the cut-off device only permitting this desired-value stipulation when the actual value of the speed of travel exceeds the stipulated value.

22. Apparatus according to claim 13, wherein, in overrun operation, an overrun cut-off is activated first before the transmission ratio is changed by the cruise controller.

23. Apparatus according to claim 22, wherein the overrun cut-off can be switched on with a hysteresis at a stipulatable difference between the desired value and the actual value of the speed of travel.

24. Apparatus according to claim 23, wherein the change in the transmission ratio can be triggered at a larger stipulatable difference between the desired value and the actual value of the speed of travel.

* * * * *

UNITED STATES PATENT AND TRADEMARK OFFICE
CERTIFICATE OF CORRECTION

PATENT NO. : 6,364,808 B1
DATED : April 2, 2002
INVENTOR(S) : Jörg Saur

It is certified that error appears in the above-identified patent and that said Letters Patent is hereby corrected as shown below:

<u>Title page,</u>
Item [57], ABSTRACT,
Line 8, change "$V_{SCHRUB}$" to -- $V_{SCHUB}$ --;

<u>Column 1,</u>
Line 42, change "tar" to -- far --;

<u>Column 3,</u>
Line 6, change "$I^{SOLL}{}_N$" to -- $I_{SOLL\_N}$ --;

<u>Column 4,</u>
Line 65, change "$V_{SCUB}$" to -- $V_{SCHUB}$ --; and

<u>Column 5,</u>
Line 11, change "P controller. 18" to -- P controller 18 --.

Signed and Sealed this

Fourth Day of February, 2003

JAMES E. ROGAN
*Director of the United States Patent and Trademark Office*